(12) United States Patent
Rarick

(10) Patent No.: US 7,082,449 B2
(45) Date of Patent: Jul. 25, 2006

(54) METHOD AND APPARATUS FOR GENERATING PSEUDO-RANDOM NUMBERS

(75) Inventor: Leonard D. Rarick, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 816 days.

(21) Appl. No.: 10/138,720

(22) Filed: May 3, 2002

(65) Prior Publication Data

US 2003/0206630 A1    Nov. 6, 2003

(51) Int. Cl.
*G06F 1/02* (2006.01)

(52) U.S. Cl. ........................... 708/250; 708/252

(58) Field of Classification Search ............... 708/252, 708/250, 253, 254, 256
See application file for complete search history.

(56) References Cited

U.S. PATENT DOCUMENTS 5,383,143 A * 1/1995 Crouch et al. ............... 708/254
5,394,405 A * 2/1995 Savir ........................... 714/739
5,745,522 A * 4/1998 Heegard ....................... 380/46

OTHER PUBLICATIONS

FIPS Pub 140-1 Federal Information Processing Standards Publication, "Security Requirements for Cryptographic Modules" (Jan. 11, 1994).
"Handbook of Applied Cryptography" CRC Press 1997 pp. 154-157, 160-161, 191-198 and 203-212.
Gutman, "Software Generation of Practically Strong Random Numbers," Proceedings of the 7th USENIX Security Symposium, San Antonio, Texas Jan. 26-29, 1998.

* cited by examiner

*Primary Examiner*—Chuong D. Ngo
(74) *Attorney, Agent, or Firm*—Meyertons Hood Kivlin Kowert & Goetzel, P.C.; Rory D. Rankin; B. Noel Kivlin

(57) ABSTRACT

A method and apparatus for generating pseudo-random numbers. The method includes defining a first set of R bits and defining a second set of S bits different from the first set of R bits. The method also includes updating the second set of S bits using a predetermined process that operates on the first set of R bits and the second set of S bits to form an updated set of S bits. The method also includes updating the first set of R bits using another predetermined process. The apparatus may include a linear feedback shift register and a second register. The linear feedback shift register is configured to store R bits. The second register is configured to store S bits. Each bit of the S bits is updated using a function that operates on one or more of the R bits from the linear feedback shift register and one or more of the S bits.

32 Claims, 10 Drawing Sheets

METHOD AND APPARATUS FOR GENERATING PSEUDO-RANDOM NUMBERS

BACKGROUND OF THE INVENTION

1. Field of the Invention

This invention relates generally to computing systems and electronics, and, more particularly, to a method and apparatus for generating pseudo-random numbers, such as in a computer system.

2. Description of the Related Art

The use of random numbers, both as true random numbers (TRN) and as pseudo-random numbers (PRN), has become very important in modem society. The advent of the inexpensive personal computer, with its astounding computing power for the cost, as well as more powerful server computers has led to an increased interest in computer security, data security, Monte Carlo modeling methods, and tie-breaking protocols, just to name a few of the areas where random numbers are used.

U.S National Institute of Standards and Technology (NIST) cryptographic standards are specified in Federal Information Processing Standards (FIPS) Publications. Tests for randomness are given in the NIST Special Publication 800-22 (with revisions dated May 15, 2001), titled "*A Statistical Test Suite For Random And Pseudorandom Number Generators For Cryptographic Applications.*" Many software algorithms for producing pseudo-random numbers pass the FIPS tests, but the software algorithms are usually relatively slow. Hardware methods used to produce true random number include measuring the rate of radioactive decay, thermal noise, or background noise, just to name a few. These hardware methods, however, employ processes that are usually difficult to reliably implement.

SUMMARY OF THE INVENTION

In one aspect of the present invention, a method that generates pseudo-random numbers is provided. The method includes defining a first set of R bits and defining a second set of S bits different from the first set of R bits. The method also includes updating the second set of S bits using a predetermined process that operates on the first set of R bits and the second set of S bits to form an updated set of S bits. The method also includes updating the first set of R bits using another predetermined process. One or more of the updated set of S bits define a pseudo-random number.

In still another aspect of the present invention, a pseudo-random number generator is provided. The pseudo-random number generator includes a register configured to store S bits and a register configured to store R bits different from the S bits. The R bits are updated using a predetermined process. The pseudo-random number generator also includes a logic circuit configured to provide N values to the register configured to store S bits. The logic circuit is further configured to update the second set of S bits using another predetermined process, which operates on the N values and the S bits to form an updated set of S bits. One or more of the updated set of S bits defines a pseudo-random number.

In still another aspect of the present invention, an apparatus that generates pseudo-random numbers is provided. The apparatus includes a linear feedback shift register and a second register. The linear feedback shift register is configured to store R bits. The second register is configured to store S bits. Each bit of the S bits is updated using a function that operates on one or more of the R bits from the linear feedback shift register and one or more of the S bits.

In yet another aspect of the present invention, a processor is provided. The processor includes an execution unit, a register configured to store S bits, and a register configured to store R bits. The R bits are updated using a predetermined process. N values are derived from the R bits. The processor also includes a logic circuit configured to provide the N values to the register configured to store the S bits. The execution unit is configured to perform an execution of an instruction for a pseudo-random number. The S bits are updated using another predetermined process that operates on the N values and the S bits. A plurality of the S bits are provided to the execution unit in response to the execution of the instruction for the pseudo-random number.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1A:
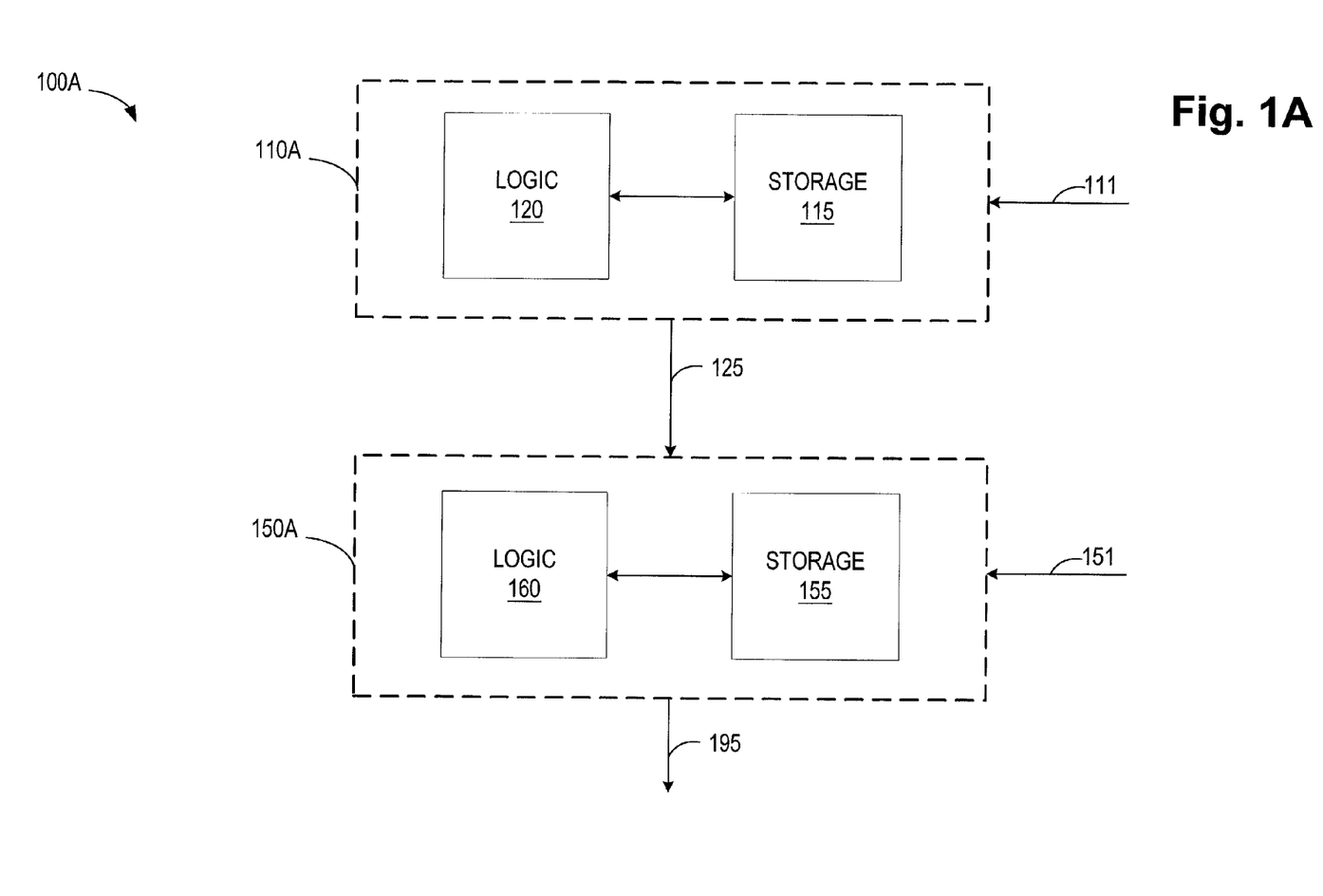
FIGS. 1A and 1B illustrate block diagrams of generalized embodiments of an XOR pseudo-random number generator in accordance with aspects of the present invention.
Figure 1B:
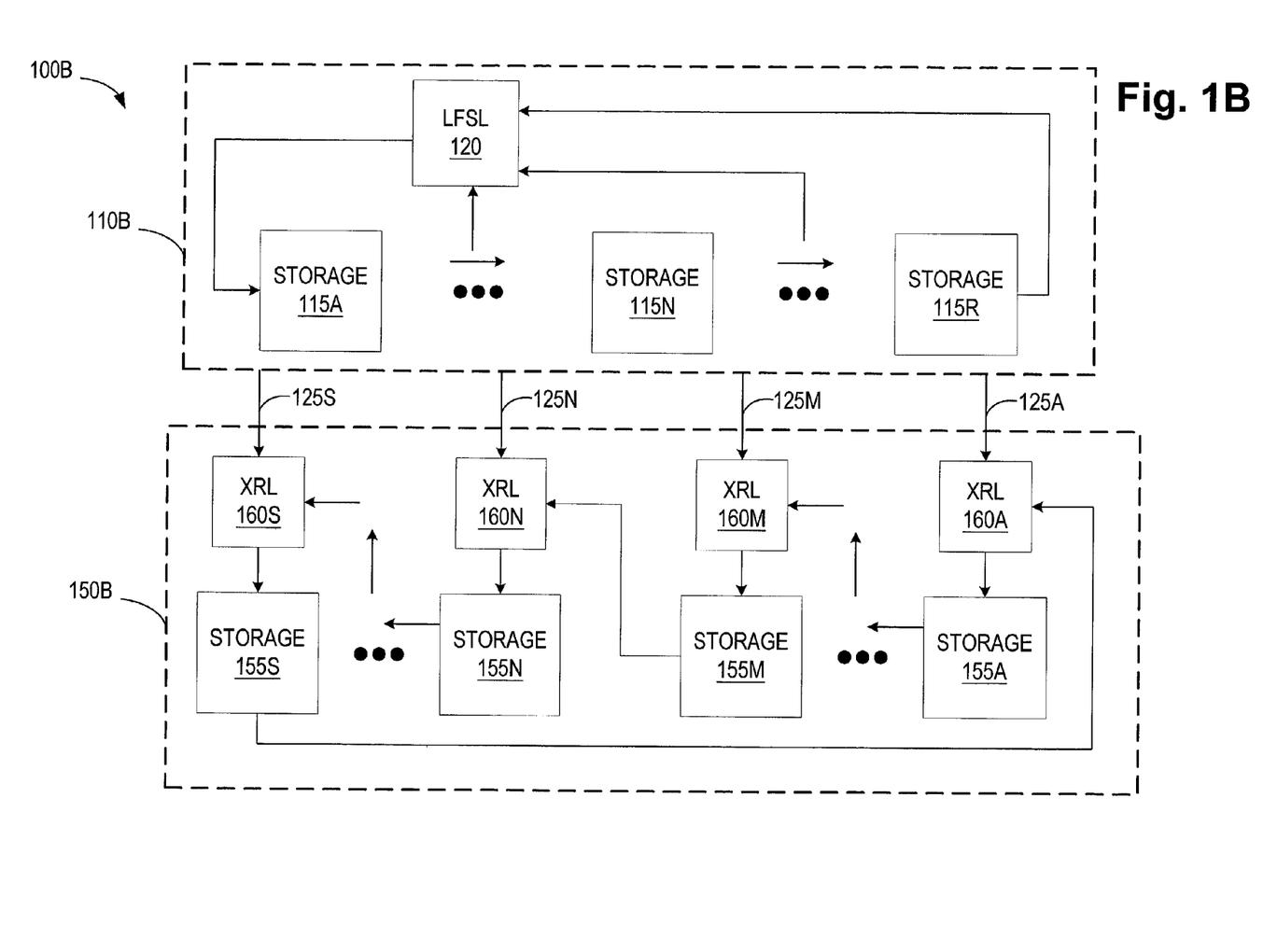

Turning now to the drawings, and specifically referring to FIGS. 1A and 1B, block diagrams of generalized embodiments of an "XOR pseudo-random number generator" 100A and 100B in accordance with the present invention are illustrated. The term "XOR" used as an adjective in a reference title is for reference only and does not imply any specific embodiment or implementation. For example, the name "XOR pseudo-random number generator" refers herein to the apparatus 100A and 100B shown in FIGS. 1A, 1B, 5, and 6. The name is for reference only and does not imply any specific embodiment or implementation, although specific embodiments or implementations may include XOR logic, as described below. Note that used herein, the term "register" is to be broadly construed to include any type of logic circuit and/or any means of storing a value.

As shown in FIG. 1A, the XOR pseudo-random number generator 100A includes a first unit 110A and a second unit 150A. The first unit 110A provides one or more values 125 to the second unit 150A. The first unit 110A includes logic circuits 120 and one or more storage locations (storage) 115. Data stored in the one or more storage locations 115 are typically updated each iteration based on one or more of the logic 120, any input values 111, and the data previously stored in the one or more storage locations 115. The input values 111 may be used to provide additional sources of entropy to the XOR pseudo-random number generator 100A. Note that for the purposes of this disclosure, the first unit 110A and the second unit 150A are examples of registers.

As shown in FIG. 1A, the second unit 150A includes logic circuits (logic) 160 and one or more storage locations (storage) 155. The data stored in the one or more storage locations 155 are typically updated each iteration by a predetermined process based on one or more of the logic circuits 160, the values 125 from the first unit 110A, the data previously stored in the one or more storage locations 155, and an optional additional source of entropy 151. The data stored in the one or more storage locations 155 may be provided as a value 195 for a pseudo-random number. Note that an output function may optionally be used to transform the value 195 for the pseudo-random number. In various embodiments of the present invention, the output function transformed value is the value 195 for the pseudo-random number. References to the value 195 for the pseudo-random number are considered herein to include the output function transformed value as well.

In general terms, the XOR pseudo-random number generator 100A is a small, fast pseudo-random number generator that can generate a large number of bits at each iteration. The XOR pseudo-random number generator 100A is suitable for implementation in either hardware or software but is fast enough for useful implementation in hardware.

In various embodiments, the logic circuits 120 of the first unit 110A implement a process defined on the integers corresponding to some subset of the R bits with a range of some predetermined set of logic functions. The predetermined set of logic functions may include OR, AND, NOT, NOR, XOR, XNOR, NAND, etc. The NOR is the "not or" logic function. The XOR is the "exclusive or" logic function. The XNOR is the "not exclusive or" logic function. The NAND is the "not and" logic function. The logic circuits 120 may also include, for example, an incrementer, an incrementer with delayed carry, linear feedback shift logic, etc. The function that defines the values 125 from the first unit 110A may include a correspondence function defined on the integers corresponding to the S bits with a range of the integers corresponding the R bits.

The second unit 150A stores S bits in the one or more storage locations 155, which may provide the pseudo-random number 195 for the XOR pseudo-random number generator 100A. The number of G bits to be produced by the XOR pseudo-random number generator 100A as the pseudo-random number will be less than or equal to S, i.e., $G<=S$. In various embodiments, the logic circuits 160 implement a predetermined process defined on the integers corresponding to some subset of the S bits with a range of the predetermined set of logic functions. The predetermined set of logic functions may include OR, AND, NOT, NOR, XOR, XNOR, NAND, etc.

The XOR pseudo-random number generator 100A uses the following selections during operation:

G=number of bits in the output pseudo-random number 195;

S=number of bits stored in the second unit 150A, $G<=S$;

The initial values for the S bits stored in the second unit 150A;

R=number of bits stored in the first unit 110A;

The initial values for the R bits;

The correspondence function that determines how the R bits map to the logic circuits 160;

The logic functions performed by the logic circuits 160; and

The G bits of the S bits that will be provided as the pseudo-random number 195.

As shown in FIG. 1B, the XOR pseudo-random number generator 100B includes a linear feedback shift register 110B and an XOR register 150B. The linear feedback shift register 110B provides values 125A, . . . , 125M, 125N, . . . , 125S to the XOR register 150B. The linear feedback shift register 110B includes a plurality of storage locations (storage) 115A, . . . , 115N, . . . , 115R, labeled from left to right, and linear feedback shift logic (LFSL) 120. The data stored in the plurality of storage locations 115A, . . . , 115N, . . . , 115R are updated in each iteration generally according to a counter-clockwise flow with various values provided to the linear feedback shift logic 120. The datum stored in the storage location 115A is typically used to update the datum stored in the storage location 115B (not shown), and so on through the storage location 115R, moving from left to right. The linear feedback shift logic 120, as shown, receives the datum from the storage location 115R and from one or more additional storage locations 115 and provides an updated value during each iteration to the storage location 115A.

As shown in FIG. 1B, the XOR register 150B includes a plurality of XOR register logic circuits (XRL) 160A, . . . , 160M, 160N, . . . , 160S, labeled from right to left, and a plurality of storage locations (storage) 155A, . . . , 155M, 155N, . . . , 155S, labeled from right to left. Each of the XOR register logic circuits 160A, . . . , 160M, 160N, . . . , 160S may receive one or more of the values from one or more of the plurality of storage locations 155A, . . . , 155M, 155N, . . . , 155S and/or one or more of the values 125A, . . . , 125M, 125N, . . . , 125S from the linear feedback shift register 110B. The data stored in the plurality of storage locations 155A, . . . , 155M, 155N, . . . , 155S are generally updated each iteration according to a counter-clockwise flow, with the datum stored in the storage location 155A typically used to update the datum stored in storage location 155B (not shown), and so on through the storage location 155S, moving from right to left. The datum stored in the storage location 155S is typically used to update the datum in the storage location 155A.

In general terms, the XOR pseudo-random number generator 100B is a small, fast pseudo-random number generator that can generate a large number of bits at each iteration. The XOR pseudo-random number generator 100B is suitable for implementation in either hardware or software but is fast enough for useful implementation in hardware.

The linear feedback shift register 110B stores R bits and through the linear feedback shift logic 120 uses a polynomial over the integers, mod 2. The linear feedback shift register 110B by itself is known in the art. The linear feedback shift register 110B is a conventional device, typically designed into each device as needed. The properties of the linear feedback shift register 110B have been well analyzed, and, by itself, the linear feedback shift register 110B is not suitable for cryptographic use. When the linear feedback shift register 110B uses a primitive polynomial, the linear feedback shift register 110B will cycle through all possible non-zero values and return to an initial non-zero value in $2^R-1$ iterations.

The XOR register 150B stores S bits, which provide the output value 195 (FIG. 1A) for the XOR pseudo-random number generator 100B. The number of G bits to be produced by the XOR pseudo-random number generator 100B as the pseudo-random number 195 will be less than or equal to S, i.e., G<=S. In one embodiment, the XOR register logic circuits 160A, . . . , 160M, 160N, . . . , 160S implement an XOR register function defined on the integers corresponding to the S bits with a range of the set {XOR, XNOR, FIRST OPERAND}. The FIRST OPERAND is a type of identity function defined as FO(a, b, . . . )=a. In other embodiments, the set may include additional or fewer logic functions, as desired. In one embodiment, the function that defines the values 125A, . . . , 125M, 125N, . . . , 125S from the linear feedback shift register 110 is a correspondence function defined on the integers corresponding to the S bits with a range of the integers corresponding the R bits.

According to one embodiment of the present invention, for each iteration of the XOR pseudo-random number generator 100B, the data stored in the plurality of storage locations 155A, . . . , 155M, 155N, . . . , 155S are updated as follows. The storage location 155A receives the datum delivered from the XOR register function 160A which operated on the datum stored in the Storage location 155(S) and the datum produced by the correspondence function to produce the value 125A. The storage location 155B (not shown) receives the datum delivered from the XOR register function 160B which operated on the datum stored in the Storage location 155A and the datum produced by the correspondence function to produce value 125B (not shown). The storage location 155C (not shown) receives the datum produced by the XOR register function 160C which operated on the datum stored in the Storage location 155B (not shown) and the datum produced by the correspondence function to produce the value 125C. The storage location 155S receives the datum produced by the XOR register function 160S operating on the datum stored in the storage location 155(S-1) and the datum produced by the correspondence function which produced the value 125S, etc.

The XOR pseudo-random number generator 100B uses the following selections during operation:
G=number of bits in the output pseudo-random number;
S=number of bits stored in the XOR register 150B, G<=S;
The initial values for the S bits stored in the XOR register 150B;
R=number of bits stored in the linear feedback shift register 110B;
The polynomial used to define the linear feedback shift register 110B;
The initial values for the R bits stored in the linear feedback shift register 110B;
The correspondence function that determines how the R bits map to the S XOR register logic circuits 160;
The XOR register function defined over the S XOR register logic circuits 160; and
The G bits of the S bits that will be provided as the value 195 of the pseudo-random number.

The following considerations may influence the particular implementation used. The speed of the XOR pseudo-random number generator 100B implemented in hardware is independent of the number of G bits in the output pseudo-random number. The number G may be chosen to be quite large, 64, 128, or more.

A long cycle length, i.e., the number of iterations before the XOR pseudo-random number generator 100B repeats, is desirable. If a primitive polynomial is chosen for the linear feedback shift register 110B and S is a prime number and not a divisor of $2^R-1$, then the cycle length will be a multiple of $2^R-1$. The cycle length may be dependent on the initial values in the plurality of storage locations 155A, . . . , 155M, 155N, . . . , 155S and the XOR register logic 160. When the XOR register logic 160 includes an odd number of XNORs, there is one case where the cycle length is $2(2^R-1)$, and the rest of the cycle lengths are $2S(2^R-1)$. The only requirement for the initial value for the plurality of storage locations 115A, . . . , 115N, . . . , 115R is that it be non-zero. The use of the FIRST OPERAND function is contemplated but discouraged, while the use of XOR and XNOR is preferred to ensure better randomness when the data stored in the plurality of storage locations 155A, . . . , 155M, 155N, . . . , 155S are provided as the value 195 (FIG. 1A) for the pseudo-random number.

Figure 2:
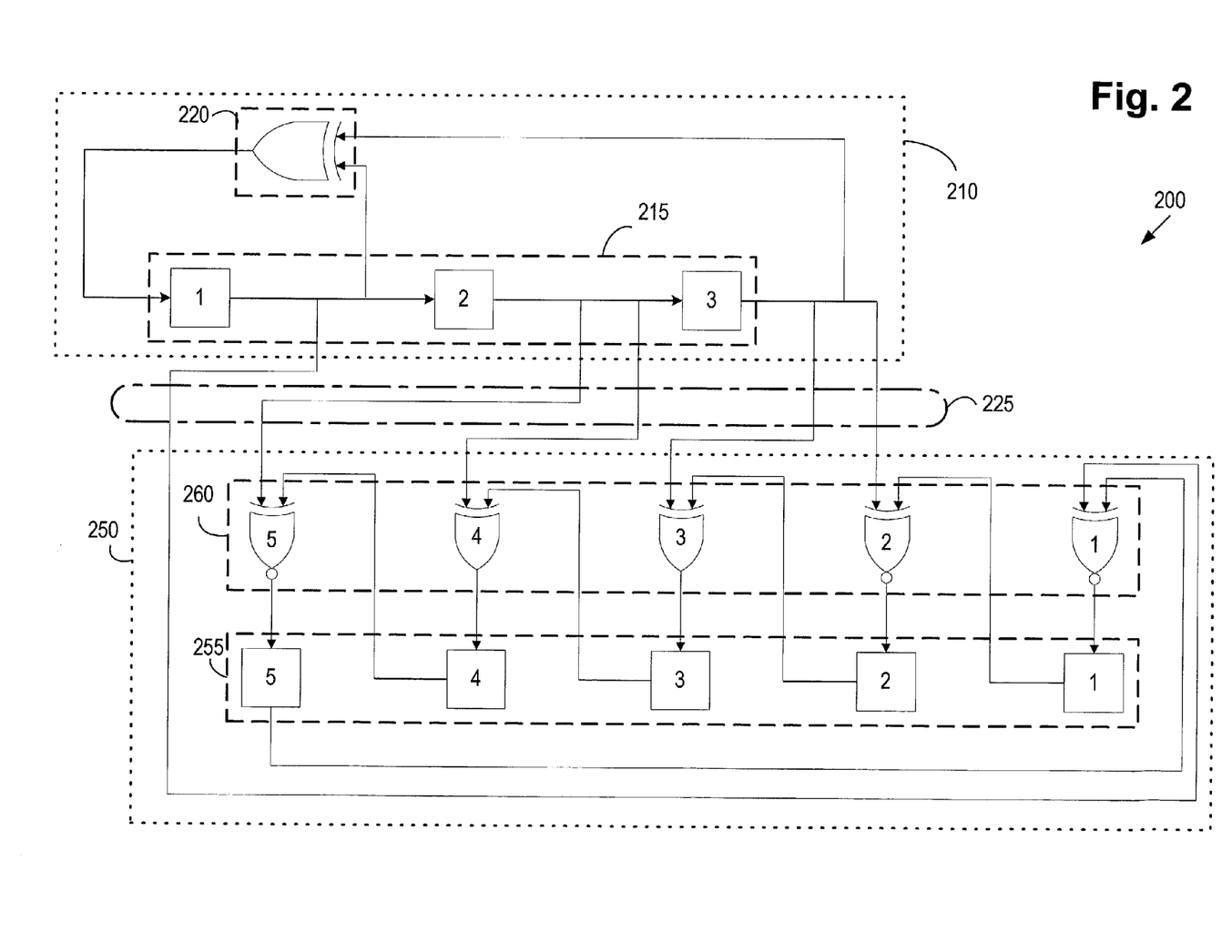
FIG. 2 illustrates a block diagram of a first example embodiment of the XOR pseudo-random number generator of FIG. 1 in accordance with one aspect of the present invention.

Turning to FIG. 2, a block diagram of a first exemplary embodiment 200 of the XOR pseudo-random number generator 100B of FIG. 1B, in accordance with one aspect of the present invention, is illustrated. Note that where FIGS. 1A and 1B use reference numbers in the 100s, FIG. 2 uses reference numbers in the 200s, but the tens and ones places correspond for ease of comparison.

As shown in FIG. 2, the XOR pseudo-random number generator 200 includes a linear feedback shift register 210 and an XOR register 250. The linear feedback shift register 210 provides a plurality of values 225 to the XOR register 250. Note that as shown, three potentially different values are provided as five values 225. The linear feedback shift register 210 includes three storage locations (collectively 215), labeled from left to right, and an XOR gate as a linear feedback shift logic 220. The datum stored in the storage location 215(1) is updated each iteration from the linear feedback shift logic 220 using the previous value of the datum stored in the storage location 215(1) XORed with the previous value of the datum stored in the storage location 215(3). The datum stored in the storage location 215(2) is updated each iteration with the previous value of the datum stored in the storage location 215(1). The datum stored in the storage location 215(3) is updated each iteration with the previous value of the datum stored in the storage location 215(2).

As shown in FIG. 2, the XOR register 250 includes five (5) XOR register logic circuits (collectively 260), labeled from right to left, and five (5) storage locations (collectively 255), labeled from right to left. The five XOR register logics 260 are (1)XNOR, (2)XNOR, (3)XOR, (4)XOR, and (5)XNOR.

As shown in FIG. 2, the datum stored in the storage location 255(1) is updated each iteration using the previous value of the datum stored in the storage location 255(5) XNORed with the previous value of the datum stored in the storage location 215(1). The datum stored in the storage location 255(2) is updated each iteration using the previous value of the datum stored in the storage location 255(1) XNORed with the previous value of the datum stored in the storage location 215(3). The datum stored in the storage location 255(3) is updated each iteration using the previous value of the datum stored in the storage location 255(2) XORed with the previous value of the datum stored in the storage location 215(3). The datum stored in the storage location 255(4) is updated each iteration using the previous value of the datum stored in the storage location 255(3) XORed with the previous value of the datum stored in the storage location 215(2). The datum stored in the storage location 255(5) is updated each iteration using the previous value of the datum stored in the storage location 255(4) XNORed with the previous value of the datum stored in the storage location 215(2).

The XOR pseudo-random number generator 200 has the following selections for operation already made:

$R=3$, so $2^R-1=2^3-1=8-1=7$;

S=5, a prime number and not a divisor of 7;

The polynomial used to define the linear feedback shift register 210 is $1+x+x^4$, with a sequence for the linear feedback shift register 210, in base 10, of 1, 4, 6, 7, 3, 5, 2, and then back to 1;

The correspondence function (S:R) is 1:1, 2:3, 3:3, 4:2, and 5:2; and

The XOR register function is {XNOR, XNOR, XOR, XOR, XNOR}. Note that there are an odd number (three) of XNOR functions.

The short cycle for the XOR pseudo-random number generator 200 is of length $2(2^R-1)=2(7)=14$. There are $(2^S-2)/2S$ long cycles, $(2^5-2)/2(5)=(32-2)/10=30/10=3$ long cycles. The long cycles for the XOR pseudo-random number generator 200 are of length $2S(2^R-1)=2(5)(7)=70$. The XOR pseudo-random number generator 200 has the following selections available:

=G number of bits in the output pseudo-random number;

The initial values for the S bits stored in the XOR register 250;

The initial values for the R bits stored in the linear feedback shift register 210; and The G bits of the S bits that will be produced as the value 195 for the pseudo-random number.

By way of example, G=5, chosen in the order 5-4-3-2-1 of the storage locations 255.

The possible values (base 10) for the storage locations 215 of the linear feedback shift register 210 and the storage locations 255 of the XOR register 250 as given here over four tables. Table 1 shows the sequence for the storage locations 215 of the linear feedback shift register 210 over the values for the short cycle for the storage locations 255 of the XOR register 250. The values are sequenced from left to right. The end of one line within a cycle is followed by the start of the next line with the restart of the sequence of the linear feedback shift register 210. The end of the last line of the cycle is followed by the start of the first line of the cycle.

TABLE 1

Short Cycle

| 1 | 4 | 6 | 7 | 3 | 5 | 2 |
|---|---|---|---|---|---|---|
| 14 | 9 | 0 | 10 | 24 | 28 | 13 |
| 17 | 22 | 31 | 21 | 7 | 3 | 18 |

Tables 2 through 4 each show the sequence for the storage locations 215 of the linear feedback shift register 210 over the values for one of the three long cycles for the storage locations 255 of the XOR register 250.

TABLE 2

First Long Cycle

| 1 | 4 | 6 | 7 | 3 | 5 | 2 |
|---|---|---|---|---|---|---|
| 0 | 21 | 25 | 25 | 31 | 18 | 17 |
| 8 | 5 | 24 | 27 | 27 | 26 | 1 |
| 9 | 7 | 28 | 19 | 11 | 27 | 3 |
| 13 | 15 | 12 | 18 | 9 | 31 | 11 |
| 29 | 14 | 14 | 22 | 1 | 15 | 10 |
| 31 | 10 | 6 | 6 | 0 | 13 | 14 |
| 23 | 26 | 7 | 4 | 4 | 5 | 30 |
| 22 | 24 | 3 | 12 | 20 | 4 | 28 |
| 18 | 16 | 19 | 13 | 22 | 0 | 20 |
| 2 | 17 | 17 | 9 | 30 | 16 | 21 |

TABLE 3

Second Long Cycle

| 1 | 4 | 6 | 7 | 3 | 5 | 2 |
|---|---|---|---|---|---|---|
| 1 | 23 | 29 | 17 | 15 | 19 | 19 |
| 12 | 13 | 8 | 26 | 25 | 30 | 9 |
| 25 | 6 | 30 | 23 | 3 | 11 | 2 |
| 15 | 11 | 4 | 2 | 8 | 29 | 15 |
| 21 | 30 | 15 | 20 | 5 | 7 | 26 |
| 30 | 8 | 2 | 14 | 16 | 12 | 12 |
| 19 | 18 | 23 | 5 | 6 | 1 | 22 |
| 6 | 25 | 1 | 8 | 28 | 20 | 29 |
| 16 | 20 | 27 | 29 | 23 | 2 | 16 |
| 10 | 1 | 16 | 11 | 26 | 24 | 5 |

TABLE 4

Third Long Cycle

| 1 | 4 | 6 | 7 | 3 | 5 | 2 |
|---|---|---|---|---|---|---|
| 3 | 19 | 21 | 1 | 14 | 17 | 23 |
| 4 | 29 | 9 | 24 | 29 | 22 | 25 |
| 24 | 4 | 26 | 31 | 19 | 10 | 0 |
| 11 | 3 | 20 | 3 | 10 | 25 | 7 |

TABLE 4-continued

Third Long Cycle

| 1 | 4 | 6 | 7 | 3 | 5 | 2 |
|---|---|---|---|---|---|---|
| 5 | 31 | 13 | 16 | 13 | 23 | 27 |
| 28 | 12 | 10 | 30 | 17 | 14 | 8 |
| 27 | 2 | 22 | 7 | 2 | 9 | 6 |
| 7 | 27 | 5 | 0 | 12 | 21 | 31 |
| 20 | 28 | 11 | 28 | 21 | 6 | 24 |
| 26 | 0 | 18 | 15 | 18 | 8 | 4 |

As an example of the flow of the values 195 of the pseudo-random numbers, consider the case where the present value of the storage locations 215 of the linear feedback shift register 210 is 2 and the present value of storage locations 255 of the XOR register 250 is 15, each bolded where they appear above. Note this is in the second long cycle shown in Table 3. The next value for the sequence for the linear feedback shift register 210 will be 1, underlined above. The next value for the XOR register 250 storage locations 255 will be 21, also underlined above.

Figure 3:
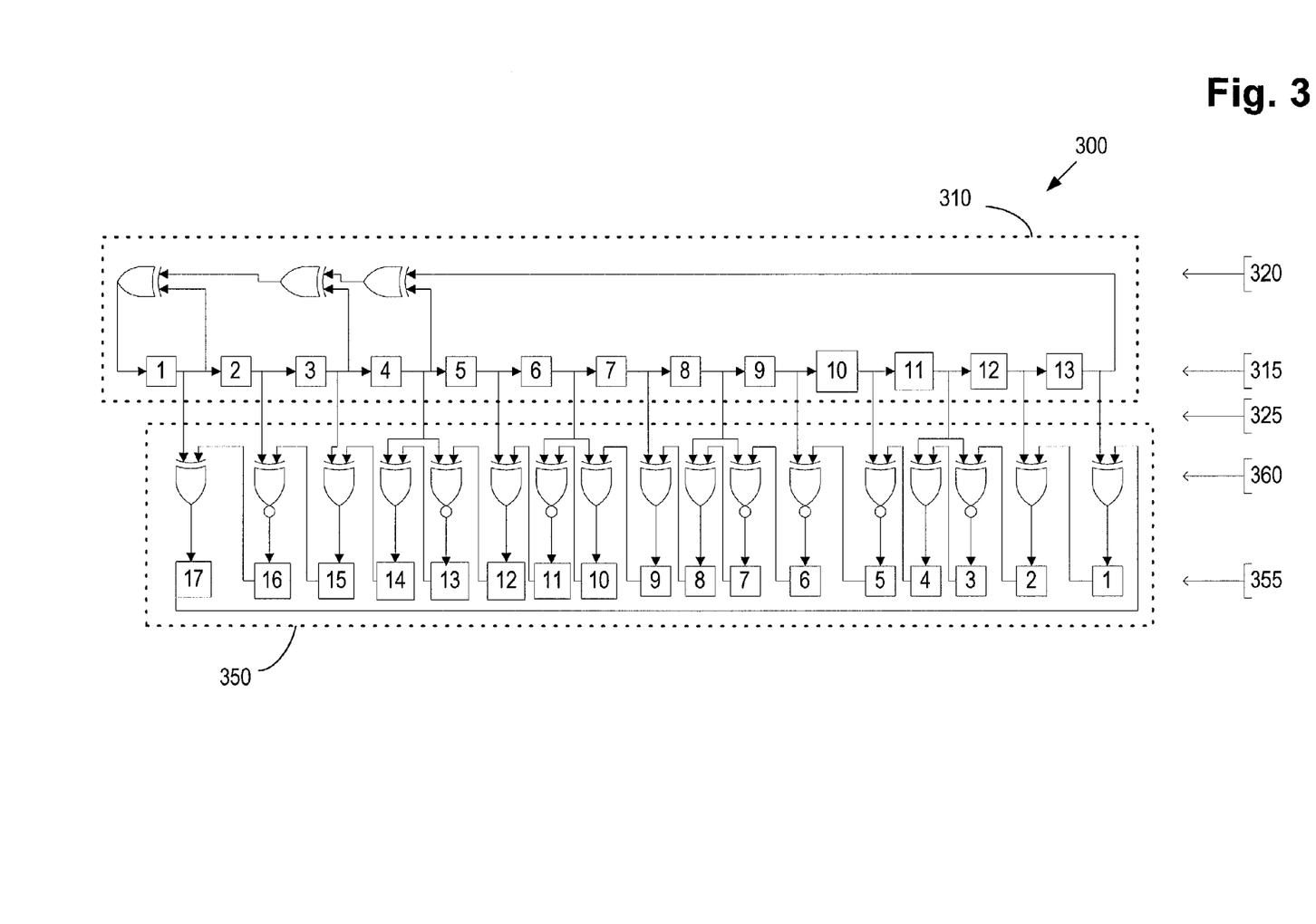
FIG. 3 illustrates a block diagram of a second example embodiment of the XOR pseudo-random number generator of FIG. 1 in accordance with one aspect of the present invention.

Turning to FIG. 3, a block diagram of a second exemplary embodiment 300 of the XOR pseudo-random number generator 100B of FIG. 1B in accordance with one aspect of the present invention is illustrated. Note that where FIGS. 1A and 1B use reference numbers in the 100s and FIG. 2 uses reference numbers in the 200s, FIG. 3 uses reference numbers in the 300s, but the tens and ones places correspond for ease of comparison.

As shown in FIG. 3, the XOR pseudo-random number generator 300 includes a linear feedback shift register 310 and an XOR register 350. The linear feedback shift register 310 provides a plurality of values 325 to the XOR register 350. Note that as shown, thirteen (13) potentially different values are provided as seventeen (17) values 225. The linear feedback shift register 310 includes 13 storage locations (collectively 315), labeled from left to right, and three XORs as linear feedback shift logic 320. For N>1, the datum stored in the storage location 315(N) is updated each iteration with the previous value of the datum stored in the storage location 315(N−1). The datum stored in the storage location 315(1) is updated each iteration from the linear feedback shift logic 320 using the previous value of the datum stored in the storage location 315(1) XORed with the output of the previous value of the datum stored in the storage location 315(3) XORed with the output of the previous value of the datum stored in the storage location 315(4) XORed with the previous value of the datum stored in the storage location 315(13).

As shown in FIG. 3, the XOR register 350 includes seventeen (17) XOR register logic circuits (collectively 360), referenced from right to left as above, and seventeen (17) storage locations (collectively 355), labeled from right to left. The 17 XOR register logics 360 are {XOR, XOR, XNOR, XOR, XNOR, XNOR, XNOR, XOR, XOR, XOR, XNOR, XOR, XNOR, XOR, XOR, XNOR, XOR}. The datum in the storage location 355(N) is updated each iteration using the previous value of the datum stored in the storage location 355(N−1, mod 17) XNORed or XORed with the previous value of the datum stored in another one of the storage locations 315.

The XOR pseudo-random number generator 300 has the following selections for operation already made:

R=13, so $2^R-1=2^{13}-1=8192-1=8191$;

S=17, a prime number, and not a divisor of 8191;

The polynomial used to define the linear feedback shift register 210 is $1+x+x^3+x^4+x^{13}$;

The correspondence function (S:R) is 1:13, 2:12, 3:11, 4:11, 5:10, 6:9, 7:8, 8:8, 9:7, 10:6, 11:6, 12:5, 13:4, 14:4, 15:3, 16:2, and 17:1; and The XOR register function is {XOR, XOR, XNOR, XOR, XNOR, XNOR, XNOR, XOR, XOR, XOR, XNOR, XOR, XNOR, XOR, XOR, XNOR, XOR}. Note that there are an odd number (seven) of the XNOR function.

The short cycle for the XOR pseudo-random number generator 300 has a length of $2(2^R-1)=2(2^{13}-1)=2(8192-1)=2(8191)=16382$. There are $(2^S-2)/2S$ long cycles, $(2^{17}-2)/2(17)=(131072-2)/34=131072/34=38\text{-}55$ long cycles. The long cycles for the XOR pseudo-random number generator 300 have lengths of $2S(2^R-1)=2(17)(2^{13}-1)=2(17)(8192-1)=2(17)(8\text{-}191)=34(8191)=278,494$. The XOR pseudo-random number generator 300 has the following selections available:

G=number of bits in the output pseudo-random number, e.g., 16;

The initial values for the S bits stored in the XOR register 350;

The initial values for the R bits stored in the linear feedback shift register 310; and The G bits of the S bits that will be output as the output pseudo-random number, e.g., the least significant 16 bits.

Computer modeling of larger embodiments of the XOR pseudo-random number generators 100 has given rise to cases such as the following, which is not illustrated in the drawings. Consider a XOR pseudo-random number generator 100B with R=49, S=67, and G=64. The polynomial used is $1+x^9+x^{49}$. The initial values are 1 for the linear feedback shift register 110B and, 1 011 011 111 100 001 010 100 010 110 001 010 001 010 111 011 010 010 101 001 101 010 101 bitwise (right to left) for the XOR register 150B. The correspondence function (S:R) is (without the S-value index) {49, 48, 47, 47, 46, 45, 45, 44, 43, 42, 42, 41, 40, 40, 39, 38, 37, 37, 36, 35, 34, 34, 33, 32, 32, 31, 30, 29, 29, 28, 27, 26, 26, 25, 24, 23, 23, 22, 21, 21, 20, 19, 18, 18, 17, 16, 15, 15, 14, 13, 12, 12, 11, 10, 9, 9, 8, 7, 7, 6, 5, 4, 4, 3, 2, 1, 1}. The XOR register function is defined as follows with N for an XNOR and O for an XOR (right to left): {OON OOO NNO ONO ONN NNO NNN OON ONO NOO NON NOO NON OON ONN OON OON OON NOO NOO OON NNO N}. This example embodiment of the XOR pseudo-random number generator 100B has one short cycle with 1,125,899,906,842,622 values. There are 1,101,298,153,654,301,589 long cycles, each with length of 75,435,293,758,455,674 values. It has not been determined if the given initial conditions correspond to the short cycle. If the given initial conditions correspond to the short cycle and if there were one iteration performed each microsecond, then the short cycle would last over 35 years. This exemplary embodiment of the XOR pseudo-random number generator 100 has passed the NIST test suite referred to above in the NIST Special Publication 800-22.

Note that if a true source of random bits (TRB), or other source of entropy, is available, then one or more values stored in either the linear feedback shift register 110 and/or the XOR register 150 may be changed by XORing or XNORing another value and the TRB (or entropy) value. Care should be taken to see that the linear feedback shift register 110 does not take on the value of zero. Adding the TRB values into an iteration usually causes the XOR pseudo-random number generator 100 to jump form one cycle to another.

Figure 4A:
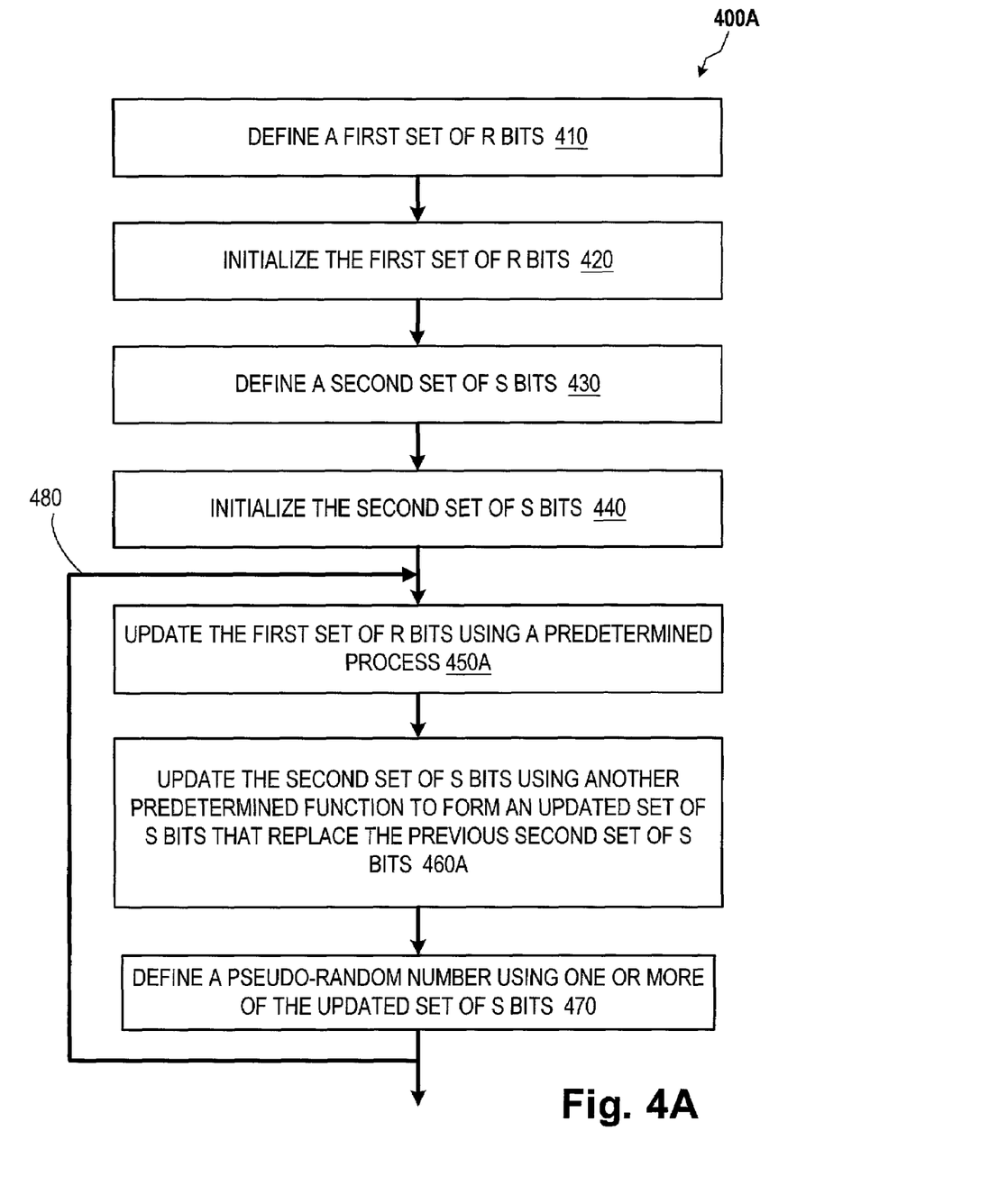
FIGS. 4A and 4B show flowcharts of methods for generating a pseudo-random number in accordance with aspects of the present invention.

Turning to FIGS. 4A and 4B, flowcharts of methods 400A and 400B for generating pseudo-random numbers in accordance with the present invention are shown. The method 400A includes defining a first set of R bits, in block 410. In other words, the first set of bits includes R bits with R>1. The method 400A also provides initial values for each of the R bits, in block 420. The method 400A also includes defining a second set of S bits, in block 430. In other words, the second set of bits includes S bits with S>1. The method 400A also provides initial values for each of the S bits, in block 440.

The method 400A updates the first set of R bits using a predetermined process, in block 450A. The method 400A updates the second set of S bits using another predetermined process that operates the first set of R bits and the second set of S bits to form an updated set of S bits that replace the previous set of S bits, in block 460A. The function in block 460A may include the functions described above with respect to FIG. 1A. The method 400A also defines a pseudo-random number using one or more of the updated set of S bits, in block 470A. Additional pseudo-random values may be obtained by repeating blocks 450A, 460, and 470, as indicated by arrow 480. Reference is made to FIG. 1A above as an example of an apparatus that may perform the method 400A.

Figure 4B:
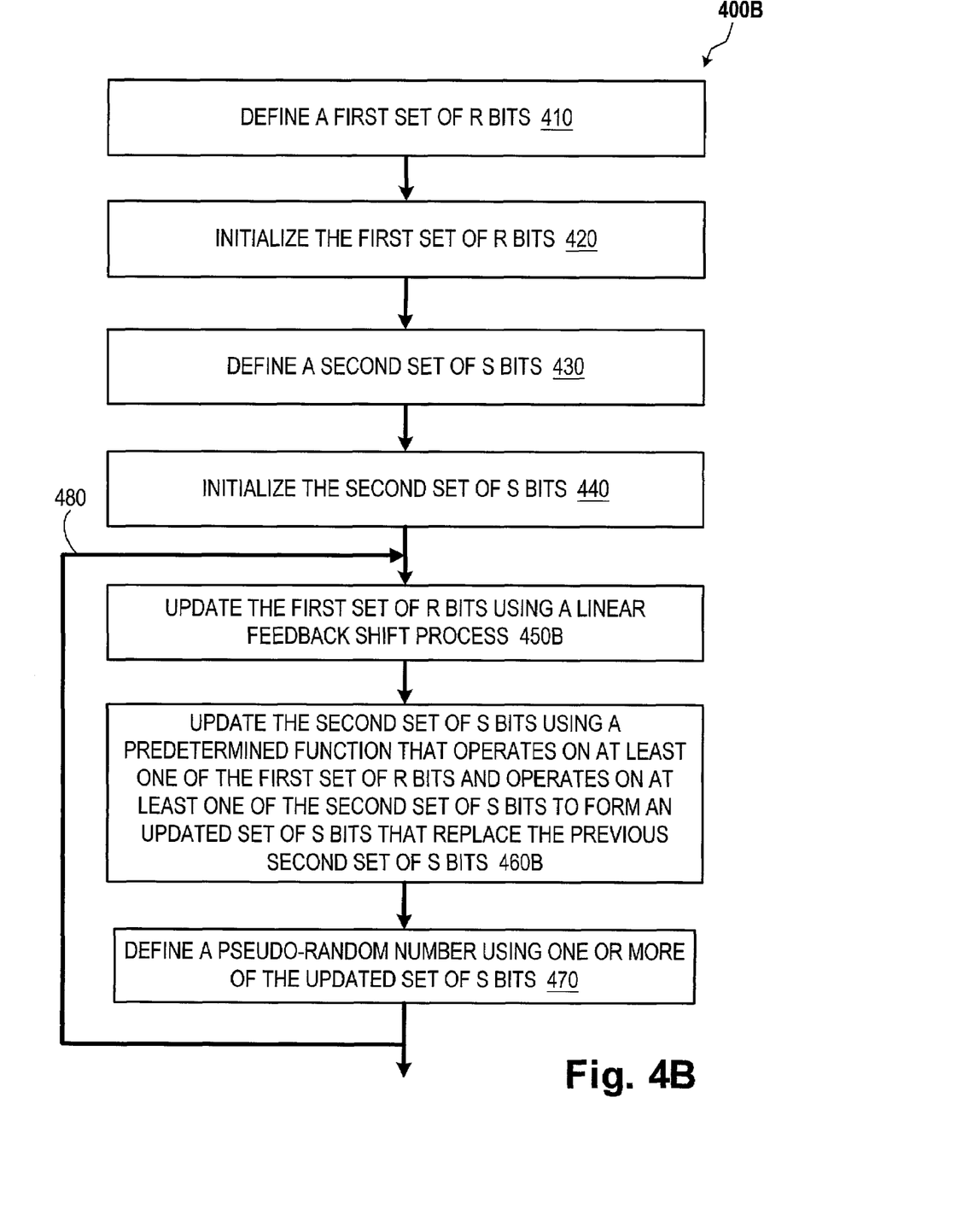

The method 400B includes defining the first set of R bits, in block 410. In other words, the first set of bits includes R bits with R>1. The method 400B also provides initial values for each of the R bits, in block 420. The only restriction on the initial values for the R bits is that the R bits cannot all be zero, in block 420, for proper functioning of the linear feedback shift process uses hereafter in the method 400B. The method 400B also includes defining a second set of S bits, in block 430. In other words, the second set of bits includes S bits with S>1. The method 400B also provides initial values for each of the S bits, in block 440.

The method 400B updates the first set of R bits using the linear feedback shift process, in block 450B. The linear feedback shift process may use any polynomial. In one embodiment, a primitive polynomial is used. Reference is made to FIGS. 1B, 2, and 3 above as examples of linear feedback shift processes. The method 400B updates the second set of S bits using a predetermined process that operates on at least one of the first set of R bits and operates on at least one of the second set of S bits to form an updated set of S bits that replace the previous set of S bits, in block 460B. The predetermined process in block 460B may include the correspondence function and the XOR register function described above with respect to FIGS. 1B, 2, and 3. The method 400B also defines a pseudo-random number using one or more of the updated set of bits, in block 470. Additional pseudo-random values may be obtained by repeating blocks 450A, 460, and 470, as indicated by arrow 480. Reference is made to FIGS. 1B and 2–3 above as examples of apparatus that may perform the method 400B.

Figure 5:
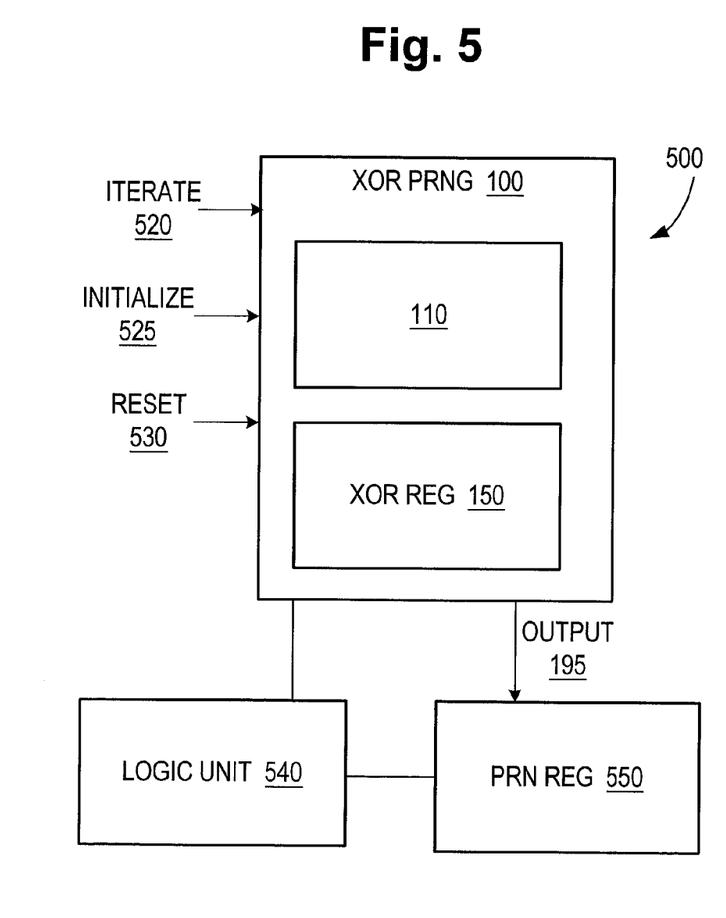
FIG. 5 illustrates a block diagram of an embodiment of a system including the XOR pseudo-random number generator of FIG. 1, in accordance with one aspect of the present invention.
Figure 6:
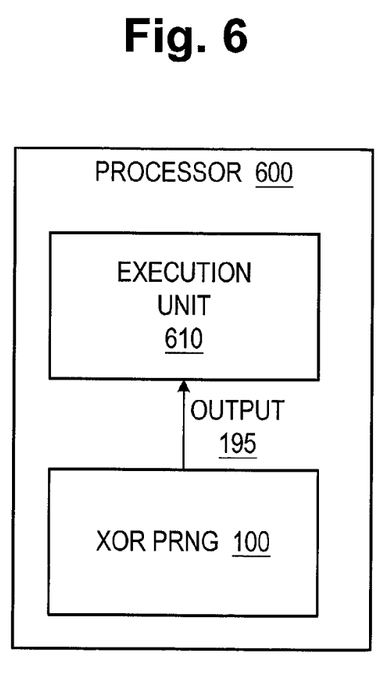
FIG. 6 illustrates a block diagram of an embodiment of a processor including the XOR pseudo-random number generator of FIG. 1, in accordance with one aspect of the present invention.

Turning to FIG. 5, a block diagram of an embodiment of a system 500 including an XOR pseudo-random number generator 100, such as the XOR pseudo-random number generators 100A or 100B of FIG. 1A, 1B, or 6, in accordance with one aspect of the present invention, is illustrated. As shown, the system 500 also includes a logic unit 540 and a pseudo-random number register 550 coupled to receive the output signal 195 of the XOR pseudo-random number generator 100. The logic unit 540 is coupled to control the XOR pseudo-random number generator 100 and the pseudo-random number register 550. The XOR pseudo-random number generator 100 is shown including the linear feedback shift register 110 and the XOR register 150. The XOR pseudo-random number generator 100 is also shown receiving an iterate signal 520, an initialize signal 525, and a reset signal 530.

In one embodiment, the XOR pseudo-random number generator 100 is configured to iterate upon receiving the iterate signal 520. In another embodiment, the XOR pseudo-random number generator 100 is configured to initialize the linear feedback shift register 110 and the XOR register 150 with values in the initialize signal 525 in response to receiving the reset signal 530. In still another embodiment, the XOR pseudo-random number generator 100 is configured to provide the pseudo-random number to the pseudo-random number register 550 through the output signal 195. In other embodiments, the linear feedback shift register 110 and the XOR register 150 may initialize to internally stored values in response to receiving the reset signal 530. The internally stored values may be stored internally to the system 500 or the XOR pseudo-random number generator 100.

Turning to FIG. 6, a block diagram of an embodiment of a processor 600 including an XOR pseudo-random number generator 100, such as the XOR pseudo-random number generators 100A or 100B of FIG. 1A, 1B, or 5, in accordance with one aspect of the present invention, is illustrated. The processor 600 also includes an execution unit 610 coupled to receive the output signal 195 from the XOR pseudo-random number generator 100. The execution unit 610 may correspond to the logic unit 540 of the system 500 shown in FIG. 5. The execution unit 610 may be configured to execute an instruction for a pseudo-random number. In one embodiment, the instruction for the pseudo-random number is a call to the XOR pseudo-random number generator 100. The XOR pseudo-random number generator 100 may be configured to respond to the call with the pseudo-random number through the output signal 195. In various embodiments, the processor 600 may include a CPU, a microprocessor, a microcontroller, a controller, a standard application specific integrated circuit (ASIC), or a custom ASIC.

Figure 7:
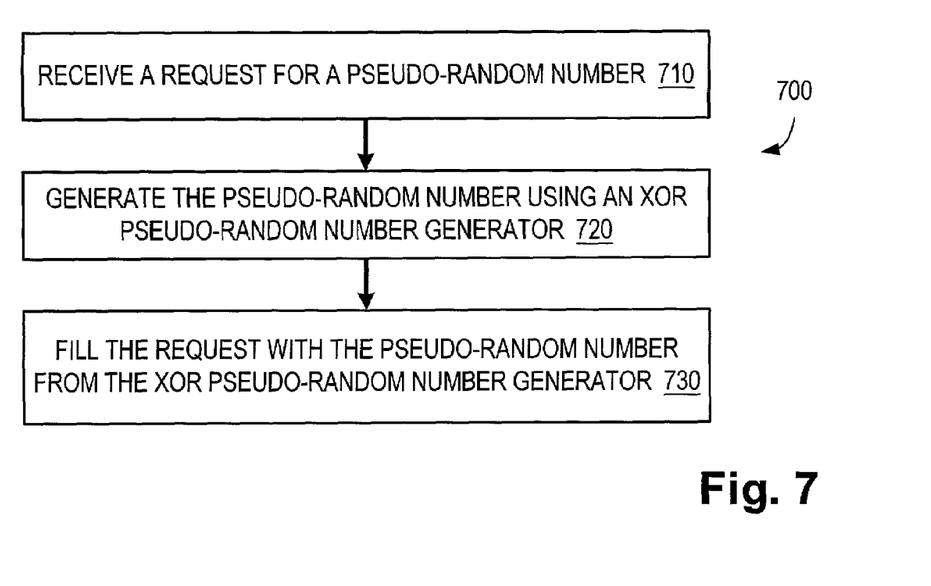
FIG. 7 shows a flowchart of a method for filling a request for a pseudo-random number in accordance with one aspect of the present invention.

Turning to FIG. 7, a flowchart of a method 700 of filling a request for a pseudo-random number in accordance with one aspect of the present invention is shown. The method 700 includes receiving the request for the pseudo-random number, in block 710. The method 700 also includes generating the pseudo-random number using an XOR pseudo-random number generator 100, in block 720. The method 700 also includes filling the request with the pseudo-random number from the XOR pseudo-random number generator 100. The method 700 may be performed in hardware or software. In various embodiments, the method 700 in hardware may be performed by the system 500 of FIG. 5 or the processor 600 of FIG. 6. Additional means of performing the method 700 are also contemplated.

Figure 8:
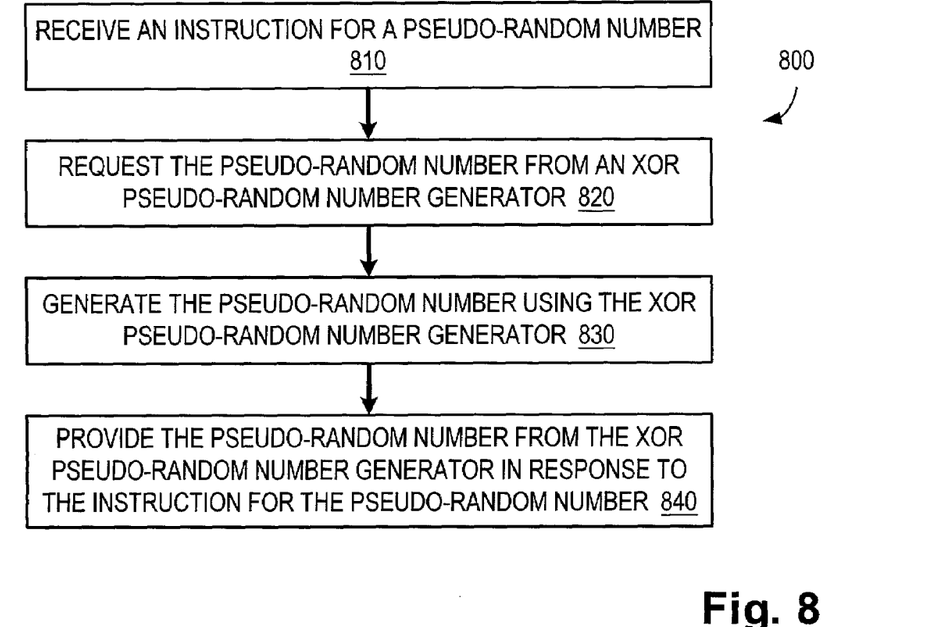
FIG. 8 shows a flowchart of a method of operating a processor, such as the processor of FIG. 6, in accordance with one aspect of the present invention.

Turning to FIG. 8, a flowchart of a method 800 of operating a processor, such as the processor 600 of FIG. 6, in accordance with one aspect of the present invention, is shown. The method 800 includes receiving an instruction for a pseudo-random number, in block 810. The method 800 also includes requesting the pseudo-random number from an XOR random number generator 100, in block 820. The requesting of the pseudo-random number from the XOR random number generator 100 may be in response to an execution of the instruction. The method 800 also includes generating the pseudo-random number using the XOR random number generator 100. The method 800 also includes providing the pseudo-random number from an XOR random number generator 100 in response to the execution of the instruction for the pseudo-random number. The providing of the pseudo-random number from an XOR random number generator 100 may also be in response to the requesting of the pseudo-random number from the XOR random number generator 100.

Figure 9:
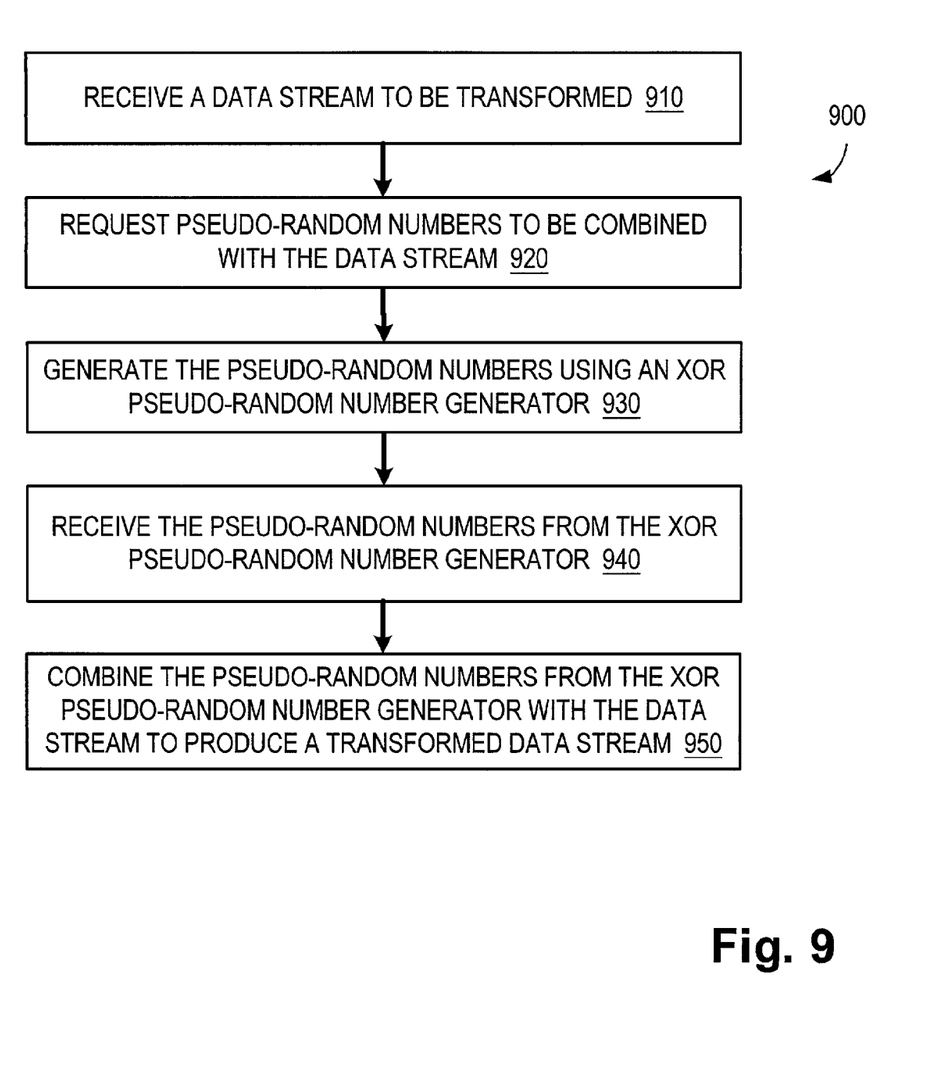
FIG. 9 shows a flowchart of a method for generating a steam cipher using the XOR pseudo-random number generator of FIG. 1, in accordance with one aspect of the present invention.

Turning to FIG. 9, a flowchart of a method 900 of generating a steam cipher using the XOR pseudo-random number generator of FIG. 1, in accordance with one aspect of the present invention is shown. The method 900 includes receiving a data stream to be transformed, in block 910. The data stream may be data to be encrypted with the stream cipher. The method 900 also includes requesting pseudo-random numbers to be combined with the data stream, in block 920. The combination may include using a cryptographic function.

The method 900 also includes generating the pseudo-random numbers using the XOR pseudo-random number generator 100, shown in FIG. 1, in block 930. The method 900 also includes receiving the pseudo-random numbers from the XOR pseudo-random number generator 100, in block 940. The method also includes combining the pseudo-random numbers from the XOR pseudo-random number generator 100 with the data stream to produce a transformed data stream, in block 950. The XOR pseudo-random number generators 100, 200, and 300 may advantageously transform or untransform a large number of bits during each iteration. Current methods are limited in the number of bits processed during each iteration.

Figure 10:
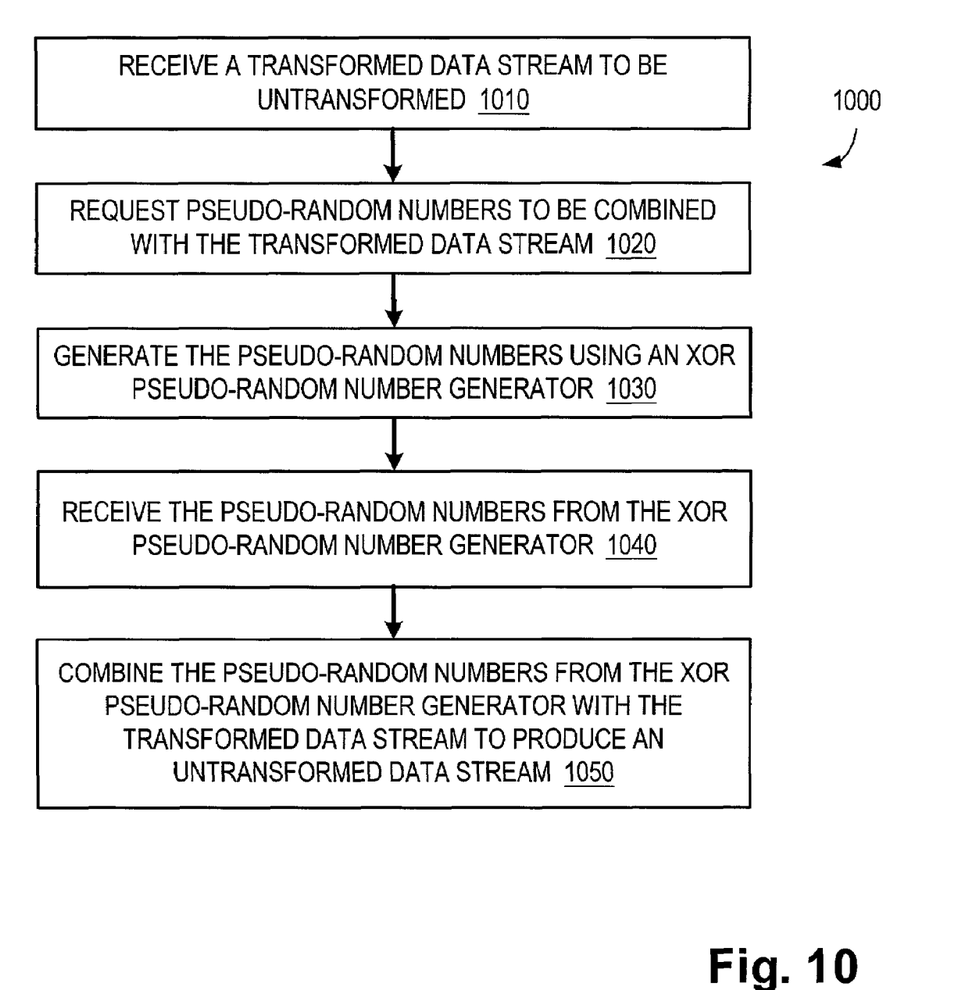
FIG. 10 shows a flowchart of a method for decrypting a steam cipher using the XOR pseudo-random number generator of FIG. 1, in accordance with one aspect of the present invention.

Turning to FIG. 10, a flowchart of a method 1000 of decrypting a stream cipher using the XOR pseudo-random number generator of FIG. 1, in accordance with one aspect of the present invention is shown. The method 1000 includes receiving a transformed data stream to be untransformed, in block 1010. The transformed data may be encrypted with the stream cipher described in FIG. 9. The method 1000 also includes requesting pseudo-random numbers to be combined with the transformed data stream, in block 1020. The combination may include using a cryptographic function.

The method 1000 also includes generating the pseudo-random numbers using the XOR pseudo-random number generator 100, shown in FIG. 1, in block 1030. The method 1000 also includes receiving the pseudo-random numbers from the XOR pseudo-random number generator 100, in block 1040. The method also includes combining the pseudo-random numbers from the XOR pseudo-random number generator 100 with the transformed data stream to produce an untransformed data stream, in block 1050.

Note that while the methods 400A, 400B, 700, 800, 900, and 1000 of the present invention disclosed herein have been illustrated as flowcharts, various elements of the flowcharts may be omitted or performed in a different order in various embodiments. Note also that the methods 400A, 400B, 700, 800, 900, and 11000 of the present invention disclosed herein admit to variations in implementation.

Some aspects of the present invention, as disclosed above, may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for generating pseudo-random numbers in a computing system, the method comprising:

defining a first set of R bits;

defining a second set of S bits different from the first set of R bits;

updating the second set of S bits using a predetermined process that operates on the first set of R bits and the second set of S bits to form an updated set of S bits, wherein one or more of the updated set of S bits define a pseudo-random number; and updating the first set of R bits using another predetermined process;

storing a plurality of bits;

performing one or more operations on the plurality of bits; and receiving an operand which causes one or more of the second set of S bits to be copied into the plurality of bits.

2. The method of claim 1, wherein updating the first set of R bits using the another predetermined function comprises updating the first set of R bits using a linear feedback shift process.

3. The method of claim 2, wherein updating the first set of the R bits using the linear feedback shift process comprises updating the first set of the R bits using the linear feedback shift method that uses a primitive polynomial.

4. The method of claim 2, further comprising:
initializing the first set of the R bits to a non-zero reset value; and
initializing the second set of the S bits to a reset value.

5. The method of claim 1, wherein updating the second set of S bits using the predetermined process that operates on the first set of R bits and the second set of S bits to form the updated set of S bits comprises updating each of the second set of S bits using a predetermined process that operates on at least one of the group consisting of the first set of R bits and the second set of S bits to form each of the updated set of S bits.

6. The method of claim 5, wherein updating each of the second set of S bits using the predetermined process that operates on at least one of the group consisting of the first set of R bits and the second set of S bits to form the updated set of S bits comprises updating each of the second set of S bits using a predetermined process that operates on at least one of the first set of R bits and operates on at least one of the second set of S bits to form each of the updated set of S bits.

7. The method of claim 6, wherein updating each of the second set of S bits using the predetermined process that operates on at least one of the first set of R bits and operates on at least one of the second set of S bits to form each of the updated set of S bits further comprises updating each of the second set of the S bits using the predetermined process that operates on at least one of the first set of R bits and operates on at least one of the second set of S bits to form each of the updated set of S bits, the predetermined process including one or more of the group consisting of XOR, XNOR, and FIRST OPERAND.

8. The method of claim 7, wherein updating each of the second set of the S bits using the predetermined process that operates on at least one of the first set of R bits and that operates on at least one of the second set of S bits to form each of the updated set of S bits, the predetermined process including one or more of the group consisting of the XOR, the XNOR, and the FIRST OPERAND further comprises updating each of the second set of the S bits using the predetermined process that operates on at least one of the first set of R bits and that operates on at least one of the second set of S bits to form the updated set of the S bits, the first predetermined function including an odd number of the XNOR.

9. The method of claim 1, further comprising: initializing the first set of the R bits to a reset value; and initializing the second set of the S bits to another reset value.

10. The method of claim 1, further comprising: receiving a request for the pseudo-random number; and providing one or more of the S bits in response to receiving the request for the pseudo-random number.

11. The method of claim 1, further comprising: receiving one or more data bits; and combining the one or more data bits with one or more of the S bits to form one or more transformed bits.

12. The method of claim 1, further comprising: receiving one or more transformed bits; and combining the one or more transformed bits with one or more of the S bits to form one or more data bits.

13. An apparatus that generates pseudo-random numbers, comprising:
means for defining a first set of R bits;
means for defining a second set of S bits different from the first set of R bits;
means for updating the second set of S bits using at least a subset of first set of R bits and the second set of S bits to form an updated set of S bits, wherein one or more of the updated set of S bits define a pseudo-random number;
means for updating the first set of R bits using the R bits;
means for storing a plurality of bits; and
logic means configured to perform one or more operations on the plurality of bits, wherein the logic means is further configured to receive an operand that indicates to the logic means to copy one or more of the second set of S bits into the plurality of bits.

14. The apparatus of claim 13, wherein the means for updating the first set of R bits using the R bits comprises means for updating the first set of R bits using a linear feedback shift process.

15. The apparatus of claim 14, wherein the means for updating the first set of R bits using a linear feedback shift process comprises means for updating the first set of R bits using a linear feedback shift process that uses a primitive polynomial.

16. The apparatus of claim 13, wherein the means for updating the second set of S bits using at least the subset of first set of R bits and the second set of S bits to form the updated set of S bits comprises means for updating each of the second set of the S bits using a predetermined process that operates on at least one of the first set of R bits and that operates on at least one of the second set of S bits to form the updated set of the S bits, the first predetermined process including an odd number of XNOR functions.

17. The apparatus of claim 13, further comprising: means for receiving one or more data bits; and means for combining the one or more data bits with one or more of the S bits to form one or more transformed bits.

18. The apparatus of claim 13, further comprising: means for receiving one or more transformed bits; and means for combining the one or more transformed bits with one or more of the S bits to form one or more data bits.

19. An apparatus that generates pseudo-random numbers, the apparatus comprising:
a linear feedback shift register configured to store R bits and to provide N values; and
a second register configured to store S bits and to receive the N values, wherein the S bits are updated using a process that operates on at least a subset of the S bits and at least a subset of the N values, wherein one or more of the S bits define a pseudo-random number;
a third register configured to store a plurality of bits; and
a logic unit configured to perform one or more operations on the plurality of bits stored in the third register, wherein the logic unit is further configured to receive an operand that indicates to the logic unit to copy one or more of the S bits stored in the second register into the third register.

20. The apparatus of claim 19, wherein the process includes a correspondence function mapping an index of the S bits to an index of the R bits and includes one or more of the group consisting of XOR, XNOR, and FIRST OPERAND.

21. The apparatus of claim 20, wherein the process includes an odd number of the XNOR.

22. The apparatus of claim 19, wherein the linear feedback shift register uses a primitive polynomial.

23. The apparatus of claim 19, wherein the pseudo-random number is generated using one or more of the S bits of the second register.

24. The apparatus of claim 19, wherein the R bits of the linear feedback shift register combined define a first value, and the R bits are initialized upon a reset with a non-zero value for the first value; and wherein the S bits of the second register combined define a second value, and the S bits are initialized upon the reset.

25. The apparatus of claim 19, further comprising: logic configured to receive one or more data bits, wherein the logic is further configured to receive one or more S bits, wherein the logic is further configured to combine the one or more data bits with the one or more S bits to form one or more transformed bits.

26. The apparatus of claim 19, further comprising: logic configured to receive one or more transformed bits, wherein the logic is further configured to receive one or more S bits, wherein the logic is further configured to combine the one or more transformed bits with the one or more S bits to form one or more data bits.

27. A processor, comprising:
an execution unit configured to perform an execution of an instruction for a pseudo-random number;
a first register configured to store S bits;
a second register configured to store R bits, wherein the R bits are updated using a predetermined process, wherein N values are derived from the R bits; and
a logic circuit configured to provide the N values to the first register configured to store the S bits, wherein the S bits are updated using another predetermined process that operates on the N values and the S bits, wherein a plurality of the S bits are provided to the execution unit in response to the execution of the instruction for the pseudo-random number;
a third register configured to store a plurality of bits; and
a logic unit configured to perform one or more operations on the plurality of bits stored in the third register, wherein the logic unit is further configured to receive an operand that indicates to the logic unit to copy one or more of the S bits stored in the second register into the third register.

28. A processor, comprising:
an execution unit configured to perform an execution of an instruction for a pseudo-random number;
a linear feedback shift register configured to store R bits; and
a second register configured to store S bits, wherein each bit of the S bits is updated using a function that operates on one or more of the R bits from the linear feedback shift register and one or more of the S bits, wherein a plurality of the S bits are provided to the execution unit in response to the execution of the instruction for the pseudo-random number;
a third register configured to store a plurality of bits; and
a logic unit configured to perform one or more operations on the plurality of bits stored in the third register, wherein the logic unit is further configured to receive an operand that indicates to the logic unit to copy one or more of the S bits stored in the second register into the third register.

29. The processor of claim 28, wherein the function includes a correspondence function mapping an index of the S bits to an index of the R bits and including one or more of XOR, XNOR, and FIRST OPERAND.

30. The processor of claim 29, wherein an odd number of the XNOR are used to update the S bits.

31. The processor of claim 28, wherein the linear feedback shift register is described by a primitive polynomial.

32. A pseudo-random number generator, comprising:
a register configured to store S bits;
a register configured to store R bits different from the S bits, wherein the R bits are updated using a predetermined process; and
a third register configured to store a plurality of bits; and
a logic circuit configured to provide N values to the register configured to store S bits, wherein the logic circuit is further configured to update the second set of S bits using another predetermined process, which operates on the N values and the S bits to form an updated set of S bits, wherein one or more of the updated set of S bits defines a pseudo-random number; and wherein the logic circuit is configured to perform one or more operations on the plurality of bits stored in the third register, and the logic circuit is configured to receive an operand that indicates to the logic circuit to copy one or more of the S bits stored in the register configured to store S bits into the third register.

* * * * *